(12) United States Patent
Zhao et al.

(10) Patent No.: US 7,537,693 B2
(45) Date of Patent: May 26, 2009

(54) UP-FLOW MULTI-STAGE ANAEROBIC REACTOR (UMAR)

(76) Inventors: Joe R. H. Zhao, Tri-Y Enterprises Ltd., 228-1820 Renfrew St., Vancouver, B.C. (CA) V5M 3H9; Shuangfei Wang, Tri-Y Enterprises Ltd., 228-1820 Renfrew St., Vancouver, B.C. (CA) V5M 3H9

( * ) Notice: Subject to any disclaimer, the term of this patent is extended or adjusted under 35 U.S.C. 154(b) by 0 days.

(21) Appl. No.: 11/744,883

(22) Filed: May 7, 2007

(65) Prior Publication Data
US 2008/0277328 A1 Nov. 13, 2008

(51) Int. Cl.
C02F 3/00 (2006.01)
(52) U.S. Cl. .................. 210/188; 210/194
(58) Field of Classification Search .......... 210/188, 210/194
See application file for complete search history.

(56) References Cited

U.S. PATENT DOCUMENTS 6,592,751 B2 * 7/2003 Haridas .................. 210/97

2003/0062305 A1 * 4/2003 Khudenko ............... 210/603

* cited by examiner

*Primary Examiner*—Chester T Barry

(57) ABSTRACT

The present invention discloses an Up-flow Multi-stage Anaerobic Reactor (UMAR) used for treatment of medium/high concentration organic wastewater. The stated UMAR with forced internal circulation, improved phase separator and added sludge inlet overcomes the disadvantages of a lower load, a longer hydraulic retention time and a larger dimension in traditional anaerobic reactors. The forced internal circulation increases capacity and cycles of internal circulation thus increased efficiency of contaminant removal. The fast jetting is avoided and efficiency of gas/liquid separation is increased by an improved bending outlet of up flow pipe. The simplified sludge addition and usage are obtained by a sludge inlet. The load of UMAR in this invention can reach about 30 kgCOD/($m^3$d) for treatment of medium/high concentration of organic wastewater from pulp and paper process and similar wastewater, being about four times of load and capacity of traditional Up-flow Anaerobic Sludge Bed (UASB) reactors.

8 Claims, 2 Drawing Sheets

UP-FLOW MULTI-STAGE ANAEROBIC REACTOR (UMAR)

FIELD OF THE INVENTION

This invention relates to an Up-flow Multi-stage Anaerobic Reactor (UMAR) used for treatment of medium/high concentration organic wastewater.

BACKGROUND OF THE INVENTION

Anaerobic digestion is an important technology in organic wastewater treatment. Anaerobic reactors are the heart of the anaerobic processes. Traditional and normally used anaerobic reactors in wastewater treatment include up-flow anaerobic sludge bed (UASB) reactors, anaerobic filters, fluidized bed reactors, and so on. The reactors mentioned can be used in treatment of a quite wide range of wastewater and can reach an acceptable level of contaminant removal. However, these reactors have some disadvantages of larger sizes, lower and unstable load capacities, unusable byproducts produced, filler plugging, costly maintenance, etc. Recently developed internal circulation (IC) reactor is a development of a UASB reactor. An IC reactor shows a number of advantages over the traditional anaerobic reactors. In an IC reactor, the internal flow is caused by gas flowing up through an "up flow pipe" and liquid flowing down through a "down flow pipe". The flow causes internal circulation in reactor and the circulation depends on the contaminant content (for example, Chemical Oxygen Demand—COD) of wastewater being treated, so that the internal circulation is to some extent controllable.

The IC reactors give a number of improvements above traditional UASB reactors and overcome the problems, to some extent, in traditional anaerobic reactors. These include: (1) Mass transfer between particulate sludge and organic contaminant is enhanced by the internal circulation so that the load is increased and lower capital investment with a smaller size can be achieved. (2) Hydraulic retention time is reduced. (3) Increased load and more stable operation. However, some problems still exist in IC reactors, which are: (1) Sludge addition is not flexible in the operations, which reduces the efficiency of contaminant removal. (2) Internal circulation is difficult to begin in starting up of the reactor and in the operations. These problems reduced the efficiency of IC reactors.

Additional improved and modified structure and design to combine with the improvements addressed above are required to overcome the disadvantages to increase efficiency of anaerobic reactors.

The following Patents and Reference are cited:

U.S. Pat. No.:

| 20030150786 (Application No.) | Verink |
|---|---|
| European Patent: | |
| EP 1 205 442 A1 | VA TECH WABAG Deutschiand GmbH &Co. KG (Applicant) |

REFERENCE:

Habets, L. H. A., Engelaar, A. J. H. H. and Groeneveld, N., Anaerobic Treatment of Inuline Effluent in an Internal Circulation Reactor, *Wat. Sci. Tech.* Vol. 35, No. 10, pp. 189-197 (1997).

SUMMARY OF THE INVENTION

The object of the present invention is to provide an improved and modified structure and process to resolve the problems in traditional anaerobic reactors and in IC reactors described above. A newly developed reactor with up-flow and multi-stage in anaerobic process (Up-flow Multi-stage Anaerobic Reactor—UMAR) is designed for treatment of medium/high concentration organic wastewater. In a UMAR, forced internal circulation, improved phase separator and added sludge inlet overcome the disadvantages of a lower load, a longer hydraulic retention time and a larger dimension in traditional anaerobic reactors. The forced internal circulation increases capacity and cycles of internal circulation thus increased efficiency. The fast jetting is avoided and efficiency of gas/liquid separation is increased by an improved bending outlet of up-flow pipe. The simplified sludge addition and usage are obtained by a sludge inlet. The load and capacity of the UMAR in this invention can reach about 30 kgCOD/$(m^3d)$ for treatment of medium/high concentration of organic wastewater from pulp and paper process and similar wastewater, being about four times of load and capacity of traditional Up-flow Anaerobic Sludge Bed (UASB) reactors.

The numbers in the FIGURES represent:
1. Influent. 2. First stage reaction zone (coarse treatment). 3. First stage three-phase separator. 4. First stage up-flow pipe. 5. Second stage reaction zone (fine treatment). 6. Second stage three-phase separator. 7. Second stage up-flow pipe. 8. Gas/liquid separator. 9. Down-flow pipe. 10. Overflow. 11. Effluent circulation pipe. 12. Water tank. 13. Support. 14. T Connector. 15. Bio-gas pipe. 16. Pump. 17. Outlet of effluent. 18. Sludge inlet. 19. Valve. 20. Screw rod. 21. Expandable rod.

DETAILED DESCRIPTION OF THE INVENTION

UMAR in the invention overcomes the disadvantages of traditional anaerobic reactors and IC reactors. UMAR mainly includes the following improvements and modifications: (1) Forced internal circulation. (2) Multi-stages (two or more stages) of reaction. (3) Improved three-phase separation. (4) Improved gas/liquid separation. (5) Flexible sludge addition.

Figure 1:
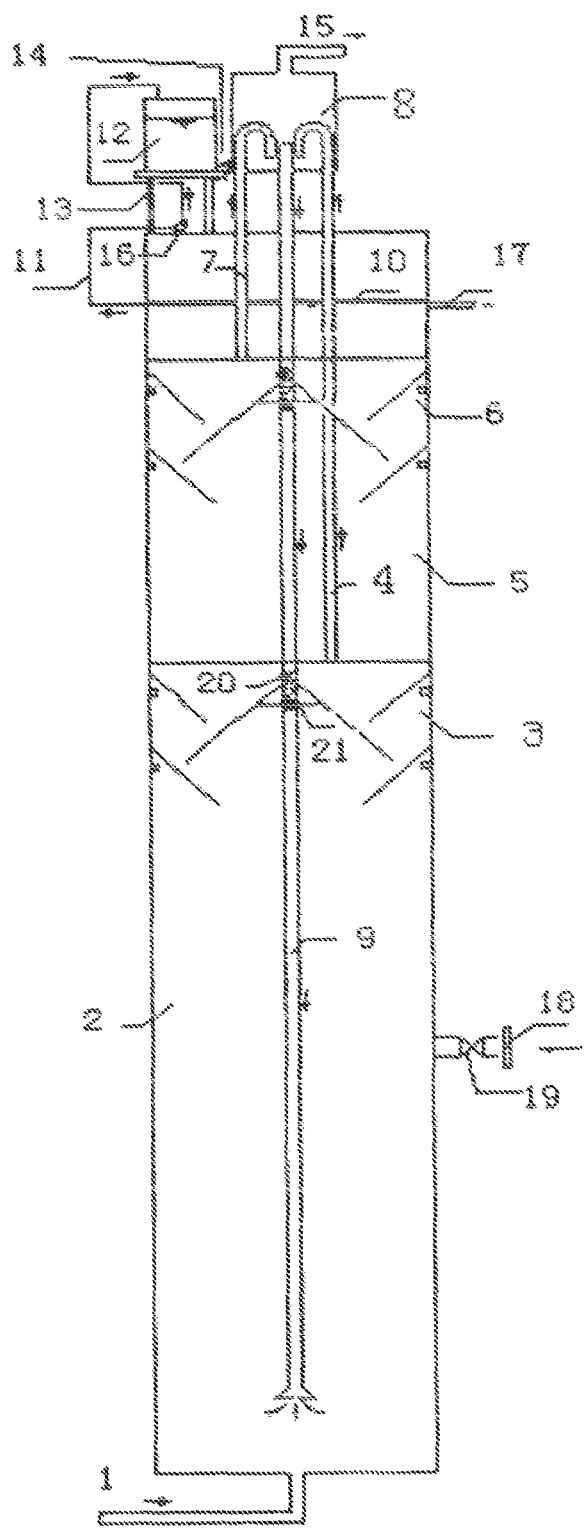
FIG. 1 is a diagrammatic structure of UMAR in the invention.
Figure 2:
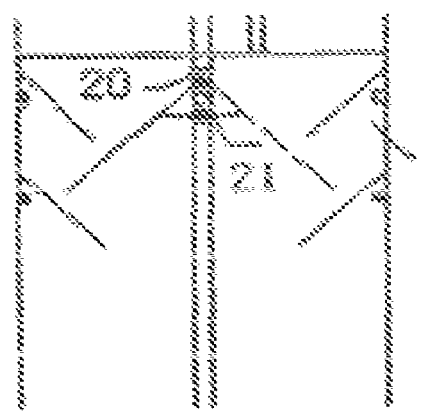
FIG. 2 is a diagrammatic structure of tree-phase separator of UMAR in the invention.
Figure 3:
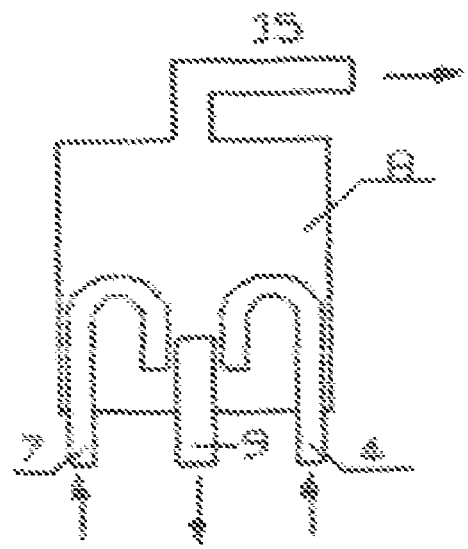
FIG. 3 is a diagrammatic structure of gas/liquid separator of UMAR in the invention.

One embodiment of the present invention is shown in FIG. 1. Influent 1 of medium/high concentration of organic wastewater is fed into the bottom of UMAR, being treated through two reaction zones (2 and 5), and effluent from Outlet of effluent 17 is discharged from the top portion of UMAR.

UMAR is designed with multiply stage reaction zones (two stages in FIG. 1), First stage reaction zone 2 being high load zone and Second stage reaction zone 5 being low load zone. Three-phase separators are installed in each reaction zone, First stage three-phase separator 3 and Second stage three-phase separator 6 respectively. The angles between two collection plates in the three-phase separators can be adjusted by Screw rod 20 and Expandable rod 21. The Overflow 10 is designed above the Second stage three-phase separator 6. First stage up-flow pipe 4 and Second stage up-flow pipe 7 are connected into the Gas/liquid separator 8 which is installed in the top portion of UMAR. The Down-flow pipe 9 is equipped to connect Gas/liquid separator 8 down to the bottom of First stage reaction zone 2. At the position of about ⅓ from the bottom of UMAR a Sludge inlet 18 with Valve 19 control is used for addition of seed sludge to the reactor when required. The bio-gas from Gas/liquid separator 8 is collected into Bio-gas pipe 15 to outlet for further application. Liquid is circulated by Pump 16 through Effluent circulation pipe 11 into Water tank 12 which may be at the top of UMAR and supported by Support 13. The liquid in Water tank 12 is circulated through T Connector 14 down to the bottom section of Gas/liquid separator 8.

The operation of UMAR is described as follows.

At the starting up or when required, the seed particulate sludge is added into the First stage reaction zone 2 through Sludge inlet 18 and controlled by Valve 19. Influent 1 with medium/high concentration is fed into First stage reaction zone 2 in which contact between contaminant and sludge particles is produced by mixing and, under the condition of high load reaction in this zone, organic contaminant in wastewater is digested into bio-gas by microorganism in particulate sludge. The bio-gas with some content of liquid is collected by First stage three-phase separator 3 and then lead into Gas/liquid separator 8 through First stage up-flow pipe 4. The bio-gas separated by Gas/liquid separator 8 is led into Bio-gas pipe 15 and the liquid flows through Down-flow pipe 9 to the bottom of the reactor. In doing this, internal circulation is produced and causes more gas with liquid in First stage reaction zone 2 to flow up through First stage up-flow pipe 4 to Gas/liquid separator 8. In addition, the internal circulation increases the mixing in First stage reaction zone 2 which benefits mass transfer and increased efficiency. The liquid in First stage reaction zone 2 automatically flows up into Second stage reaction zone 5 with further fine treatment. The bio-gas with some liquid is collected by Second stage three-phase separator 6 and flows up through Second stage up-flow pipe 7 into Gas/liquid separator 8 in which separated bio-gas is lead into Bio-gas pipe 15 and, the separated liquid flows down through Down-flow pipe 9 to the bottom of the reactor. Effluent (clean water) is discharged from Overflow 10 through Effluent circulation pipe 11. The effluent (clean water) can be pumped through T Connector 14 into Water tank 12 by pump 16 or into Gas/liquid separator 8 to force internal circulation. The effluent (clean water) from Second stage reaction zone 5 is discharged into Outlet of effluent 17.

The UMAR in the invention can have a larger ratio between its height and diameter to save area occupied, and the operations have proven to be stable and to reach a high efficiency of contaminant removal. UMAR can reach a load of about 30 kgCOD/(m³d) for treatment of medium/high concentration of organic wastewater from pulp and paper process and similar wastewater.

An Up-flow Multi-stage Anaerobic Reactor (UMAR) is designed and equipped with forced internal circulation by pumping liquid into a holding tank which is connected to a gas/liquid separator from which liquid flows through a down flow pipe to the bottom portion of the reactor. Two or more reaction zones are designed with three-phase separators in each zone and a gas/liquid separator is equipped in the top of final reaction zone. The separated liquid from gas/liquid separator is led to flow into the bottom portion of the first reaction zone of the reactor. The angles between two collection plates of three-phase separator can be adjusted from angles of 60° to 120° by a screw rod and an expandable rod connected to collection plates. The outlet of up flow pipe to a gas/liquid separator is designed with 60-90° bending down and the outlet of pipe is immersed into liquid so that liquid seal can be obtained. A sludge inlet is equipped at a location of ⅙-½ (preferred at about ⅓) of the height from bottom of the reactor to add seed sludge when required.

The invention claimed is:

1. A reactor comprising:
    a wastewater inlet at the bottom of the reactor;
    a first-stage reaction zone in fluid communication with and above the inlet;
    at least one first-stage three-phase separator in the first-stage reaction zone;
    a sludge inlet in fluid communication with the first-stage reaction zone;
    a second-stage reaction zone in fluid communication with and above the first-stage reaction zone;
    at least one second-stage three-phase separator in the second-stage reaction zone;
    a separation zone comprising a gas/liquid separator above the second-stage reaction zone;
    a first-stage upflow pipe in fluid communication with the upper portion of the first-stage reaction zone and the gas/liquid separator;
    a second-stage upflow pipe in fluid communication with the upper portion of the second-stage reaction zone and the gas/liquid separator;
    a gravity-fed downflow pipe in fluid communication with the bottom portion of the first-stage reaction zone and the gas/liquid separator;
    a treated effluent outlet in the separation zone;
    a pump in fluid communication with the gas/liquid separator and a water tank, the pump capable of providing continuous internal circulation of liquid in the reactor;
    a biogas outlet in fluid communication with the gas/liquid separator;
    biogas;
    organics-laden wastewater within the inlet;
    sludge; and
    anaerobic biological organisms.

2. The reactor of claim 1 further comprising a third-stage reaction zone.

3. The reactor of claim 1 wherein the first-stage reaction zone comprises two three-phase separators.

4. The reactor of claim 1 wherein liquid flowing down by gravity from the gas/liquid separator through the downflow pipe is capable of inducing internal circulation of liquid in the reactor.

5. The reactor of claim 1 wherein the three-phase separators each comprise two angled collection plates, the angles of which can be adjusted from 60°- 120° by a screw rod and an expandable rod connected to the collection plates.

6. The reactor of claim 1 wherein the uppermost ends of the upflow pipes are bent 60°- 90° such that the outlets are at a lower elevation than the uppermost end of the downflow pipe such that in use, the ends of the upflow pipes are immersed in liquid thereby forming a liquid seal.

7. The reactor of claim 1 wherein the sludge inlet is located at a location that is ⅙-½ the height of the reactor above the bottom of the reactor.

8. The reactor of claim 7 wherein the sludge inlet is located at a location that is about ⅓ the height of the reactor above the bottom of the reactor.

\* \* \* \* \*